United States Patent [19]

George

[11] Patent Number: 4,631,595
[45] Date of Patent: Dec. 23, 1986

[54] FEEDBACK DISPLAY DRIVER STAGE

[75] Inventor: John B. George, Carmel, Ind.

[73] Assignee: RCA Corporation, Princeton, N.J.

[21] Appl. No.: 758,954

[22] Filed: Jul. 25, 1985

[51] Int. Cl.[4] .......................... H04N 5/68; H04N 9/16
[52] U.S. Cl. .................................................... 358/243
[58] Field of Search ............... 358/243, 160, 166, 167, 358/174, 37

[56] References Cited

U.S. PATENT DOCUMENTS

| | | | |
|---|---|---|---|
| 4,387,405 | 6/1983 | Hinn | 358/243 |
| 4,547,799 | 10/1985 | Rodgers, III | 358/243 |
| 4,577,234 | 3/1986 | Harlan | 358/243 |

OTHER PUBLICATIONS

Technical Publication for DIGIT 2000 Digital TV System, ITT Corp., Figure 3-5, p. 61.

Primary Examiner—Tommy P. Chin
Attorney, Agent, or Firm—P. J. Rasmussen; P. M. Emanuel; R. H. Kurdyla

[57] ABSTRACT

In a television receiver including a kinescope, a kinescope driver stage includes a video amplifier with an associated feedback path. A first emitter follower transistor couples amplified video signals from the amplifier output to the kinescope. A second emitter follower transistor, included in the feedback path for maintaining the continuity thereof, couples amplified video signals to the kinescope when a normally nonconductive diode coupled between the outputs of the emitter follower transistors is rendered conductive in the presence of large video signal amplitude transitions sufficient to render the first follower transistor nonconductive.

7 Claims, 1 Drawing Figure

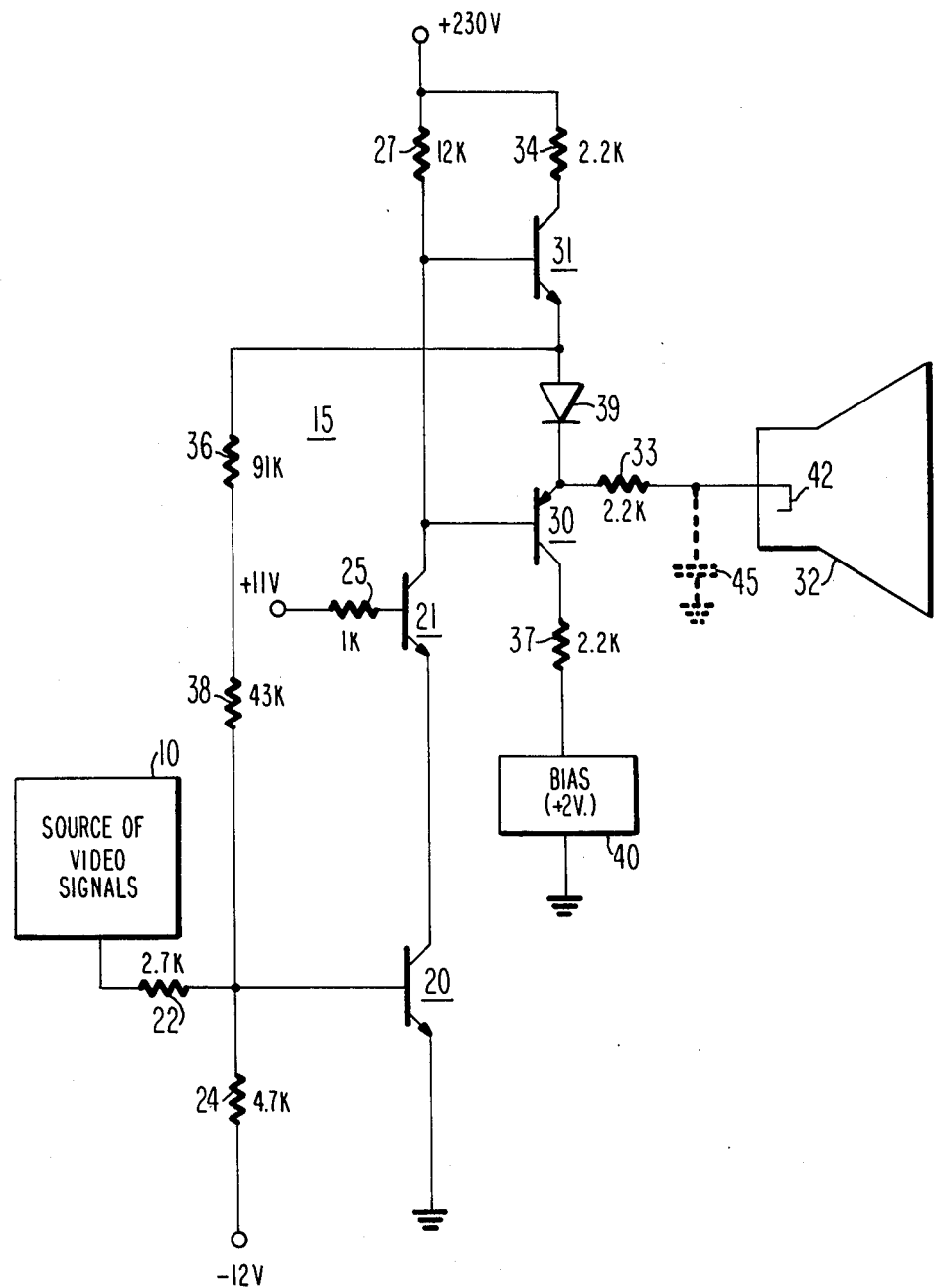

FEEDBACK DISPLAY DRIVER STAGE

This invention concerns a video output display driver for supplying high level video output signals to an image display device such as a kinescope in a television receiver. In particular, this invention concerns a driver including a degenerative feedback loop.

A video display driver including a degenerative feedback network is often used to supply a high level video signal to an intensity control electrode, e.g., a cathode electrode, of a kinescope in a television receiver. The feedback network assists to establish the signal gain of the driver, and to stabilize the DC operating voltage at the driver output. The feedback network also serves to reduce the driver output impedance, thereby improving the driver bandwidth and high frequency response by reducing the bandwidth limiting effect of parasitic capacitances associated with the output circuit of the driver.

It is herein recognized that with some feedback driver designs there exists a likelihood that the driver feedback loop will be disrupted under certain signal conditions such as when large video signal transients occur. Disruption of the feedback loop is undesirable since feedback transients including signal "ringing" can occur. The visible effect of signal ringing in a displayed image resembles a "ghosting" or "stripped" effect along the edges of image transitions.

A feedback display driver stage in accordance with the principles of the present invention is arranged to prevent the driver feedback loop from being disrupted. In the disclosed driver stage a first transistor couples video signals from the driver output to the display device. A second transistor included in the driver feedback loop maintains the continuity of the feedback loop. The second transistor in addition is selectively enable to couple the driver output to the display device in the presence of video signal conditions which render the first video signal coupling transistor nonconductive.

The single FIGURE of the drawing shows a schematic circuit diagram of a video signal display driver stage pursuant to the present invention.

A low level video signal is provided by a source 10 to a kinescope driver stage 15 comprising an amplifier including an input common emitter amplifier transistor 20 arranged in a cascode amplifier configuration with a common base amplifier transistor 21. The video signal is coupled to the base input of transistor 20 via a current determining resistor 22. Base bias for transistor 20 is provided by a resistor 24 in association with a source of negative DC voltage (−V). Base bias for transistor 21 is provided through a resistor 25 from a source of positive DC voltage (+V). Resistor 25 in the base circuit of transistor 21 assists to stabilize transistor 21 against oscillation.

The output circuit of driver stage 15 includes a load resistor 27 in the collector output circuit of transistor 21, across which a high level amplified video signal is developed. The output circuit of the driver stage also includes opposite conductivity type emitter follower transistors 30 and 31 with base inputs coupled to the collector of transistors 21. A high level amplified video signal is coupled from the emitter output of PNP follower transistor 30, which corresponds to the output terminal of driver 15, to a cathode electrode 42 of an image reproducing kinescope 32 via a kinescope arc current limiting resistor 33. The low impedance emitter output of transistor 31 is coupled through a noramlly nonconductive diode 39 to the emitter output of transistor 30. A resistor 34 in the collector circuit of NPN follower transistor 31 also serves as a kinescope arc current limiting resistor. Degenerative feedback for the driver stage is provided by series resistors 36 and 38 coupled from the emitter of transistor 31 to the base of transistor 20.

Collector bias for transistor 30 is provided by a source of bias potential 40, which may include a clamping network of the type described in my copending U.S. patent application Ser. No. 758,755 titled "Kinescope Driver with Kinescope Current Sampling Circuit," filed concurrently herewith. A collector resistor 37 also acts as a kinescope arc current limiting resistor.

Transistors 20, 21 and 31 together with resistors 22, 36 and 38 form an operational feedback amplifier with a signal gain determined by the ratio of the values of feedback resistors 36 and 38 to the value of input resistor 22. The amplifier feedback loop includes transistors 20 and 21, resistor 27, transistor 31, and resistors 36 and 38. In order to keep the amplifier from ringing, it is necessary to maintain continuity of the feedback loop from the amplifier output at the collector of transistor 21 to the amplifier input at the base of transistor 20 via feedback resistors 36 and 38 at all times. This is accomplished by employing feedback resistors 36 and 38 as the emitter circuit resistance for follower transistor 31, which remains conductive at all times. This arrangement results in low power dissipation for transistor 31 due to its high emitter impedance as determined primarily by the values of feedback resistors 36 and 38. Thus an inexpensive low power device can be used for transistor 31. Transistors 31 and 30 share a common base input connection at the collector of transistor 21, and diode 39 is normally reverse biased by the base-emitter junction voltage drops of transistors 30 and 31.

Diode 39 connected between the emitters of transistors 30 and 31 as shown is normally reverse biased, but is rendered conductive under certain conditions in response to a sufficiently large positive-going video signal transient at the interconnected base electrodes of transistors 30 and 31, which renders transistor 30 nonconductive.

During large, positive-going video signal amplitude transients at the bases of transistors 30 and 31 kinescope capacitance 45 will momentarily hold the kinescope cathode voltage constant. In such case transistor 30 may be momentarily rendered nonconductive with the result that diode 39 begins to conduct. The conduction of diode 39 results in kinescope cathode 42 being momentarily connected to the low impedance emitter output of follower transistor 31 whereby cathode capacitance 42 is rapidly charged via emitter current of transistor 31. Transistor 31 remains conductive for this condition and for normal signal conditions, whereby the feedback loop remains intact and disruptive ringing is avoided. Thus transistor 31 not only serves to maintain the continuity of the feedback loop, but also represents a source of charging current for the kinescope capacitance when the conduction of transistor 30 is disrupted.

Resistor 34 in the collector circuit of transistor 31 and resistor 37 in the collector circuit of transistor 30 preferably should be matched in value so that transistors 30 and 31 exhibit substantially equal slew rates.

In this embodiment a relatively large value of load resistor 27 helps to conserve power in amplifier 20, 21. Emitter follower transistors 30 and 31 isolate load resistance 27 from kinescope cathode capacitance 45, thereby preventing the high frequency response of the driver stage from being adversely affected by the low pass filtering effect otherwise produced by the combination of resistance 27 and capacitance 45. Thus transistor 31 assists to reduce the capacitance at the collector output of transistor 21 while assuring that the amplifier feedback loop is not disrupted as discussed.

What is claimed is:

1. In a video signal processing system including an image display device for displaying video information in response to a video signal applied thereto, a display driver stage comprising:

an amplifier with an input for receiving video signals, and an output;

a first semiconductor device with an input coupled to said amplifier output, and an output for providing video signals to said display device;

a second semiconductor device with an input coupled to said amplifier output, and an output;

a feedback path coupled from said output of said second semiconductor device to said amplifier input; and a normally nonconductive third semiconductor device coupled between said outputs of said first and second semiconductor devices and poled to conduct current from said output of said second semiconductor device; said third device being rendered conductive for coupling said amplifier output to said display device via said second semiconductor device in response to said first semiconductor device being rendered nonconductive in the presence of large video signal transitions of a given polarity.

2. A driver stage according to claim 1, wherein: said third semiconductor device is a diode.

3. A driver stage according to claim 1, wherein: said first and second semiconductor device are opposite conductivity type devices.

4. A driver stage according to claim 1, wherein: said first and second semiconductor devices are transistors of mutually opposite conductivity type each with an input base electrode and an output emitter electrode; and said third semiconductor device is a diode coupled between said emitters of said first and second transistors and poled to conduct current from said emitter of said second transistor.

5. A driver stage according to claim 1, wherein: said first and second semiconductor devices are coupled to load impedances of substantially equal value.

6. In a video signal processing system including an image display device for displaying video information in response to a video signal applied thereto, a display driver stage comprising:

a first transistor means with a video signal input, and an output;

a second, PNP, transistor with a base input coupled to said output of said first transistor means, and an emitter output for providing video signals to said display device;

a third, NPN, transistor with a base input coupled to said output of said first transistor means, and an emitter output;

a feedback network coupled from said emitter of said third transistor to said input of said first transistor means; and a normally nonconductive semiconductor device coupled between said emitters of said second and third transistors and poled for conducting current from said emitter of said third transistor to said display device, said semiconductor device being rendered conductive for conducting emitter current from said third transistor to said display device in response to said second transistor being rendered nonconductive in response to large positive-going video signal amplitude transitions.

7. A driver stage according to claim 6, wherein: said second and third transistors have collector electrodes each respectively coupled to an operating potential via substantially equal value impedances.

* * * * *